(12) United States Patent
Tsurube et al.

(10) Patent No.: US 10,791,252 B2
(45) Date of Patent: Sep. 29, 2020

(54) IMAGE MONITORING DEVICE, IMAGE MONITORING METHOD, AND RECORDING MEDIUM

(71) Applicant: Panasonic Intellectual Property Management Co., Ltd., Osaka (JP)

(72) Inventors: Tomoyuki Tsurube, Tokyo (JP); Nobuyuki Hirose, Kanagawa (JP); Kohei Yamaguchi, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/683,311

(22) Filed: Nov. 14, 2019

(65) Prior Publication Data

US 2020/0084356 A1   Mar. 12, 2020

Related U.S. Application Data

(63) Continuation of application No. PCT/JP2018/025299, filed on Jul. 4, 2018.

(30) Foreign Application Priority Data

Aug. 1, 2017   (JP) .................. 2017-149224

(51) Int. Cl.
*H04N 5/225* (2006.01)
*H04N 5/235* (2006.01)
*H04N 7/18* (2006.01)

(52) U.S. Cl.
CPC ....... *H04N 5/22521* (2018.08); *H04N 5/2351* (2013.01); *B60R 2300/8066* (2013.01); *G06T 2207/30252* (2013.01)

(58) Field of Classification Search
CPC .... H04N 5/2353; H04N 5/235; H04N 17/002; H04N 17/00; H04N 5/2351;
(Continued)

(56) References Cited

U.S. PATENT DOCUMENTS

2013/0300869 A1* 11/2013 Lu ..................... B60R 1/00
                                                    348/148
2014/0010408 A1   1/2014 Irie et al.
(Continued)

FOREIGN PATENT DOCUMENTS

JP   2003-189294   7/2003
JP     3807331 B   8/2006
(Continued)

OTHER PUBLICATIONS

International Search Report of PCT application No. PCT/JP2018/025299 dated Aug. 28, 2018.

*Primary Examiner* — Sherrie Hsia
(74) *Attorney, Agent, or Firm* — Greenblum & Bernstein, P.L.C.

(57) ABSTRACT

An image monitoring device includes a luminance calculator and a darkness determiner. The luminance calculator calculates a first average luminance value of an illuminated region which is illuminated with a lamp and a second average luminance value of a non-illuminated region which is not illuminated with the lamp. The illuminated region and the non-illuminated region are included in a video signal generated by capturing with a lens. The darkness determiner determines whether or not the video signal is captured in dark by comparing a difference between the first average luminance value and the second average luminance value with a first threshold value.

7 Claims, 4 Drawing Sheets

(58) Field of Classification Search
CPC ...... H04N 5/22521; H04N 7/181; H04N 7/18;
G06T 2207/10016; G06T 2207/30168;
G06T 2207/30252; G06T 7/0002; B60R
2300/8066; B60R 2300/108
USPC .... 348/180, 187, 118, 119, 148, 150, 221.1,
348/234–236, 238, 362, 364, 366, 243,
348/248, 251, 257, 258, 687, 688, 690,
348/691; 382/154, 107, 103, 104, 149
See application file for complete search history.

(56) References Cited

U.S. PATENT DOCUMENTS

2015/0324972 A1 11/2015 Hayakawa et al.
2016/0165101 A1 6/2016 Akiyama et al.

FOREIGN PATENT DOCUMENTS

| | | |
|---|---|---|
| JP | 2007-208865 | 8/2007 |
| JP | 4087600 B | 5/2008 |
| JP | 2014-056382 | 3/2014 |
| JP | 2015-026987 | 2/2015 |
| JP | 5977827 B | 8/2016 |
| JP | 6117634 B | 4/2017 |

* cited by examiner

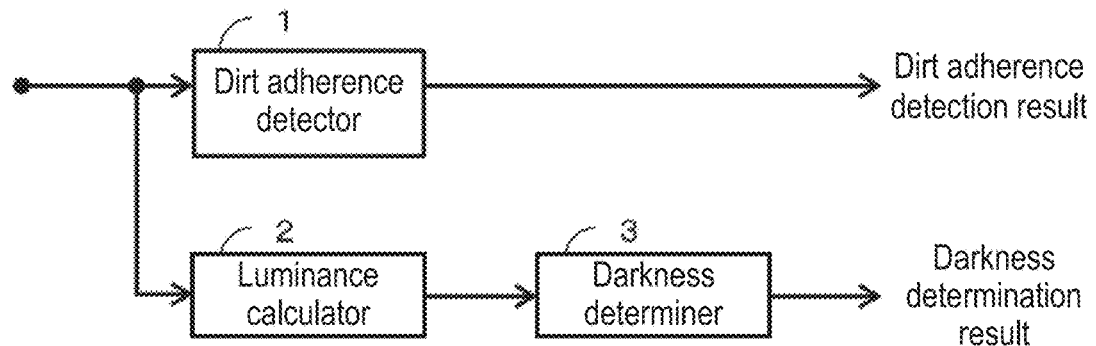
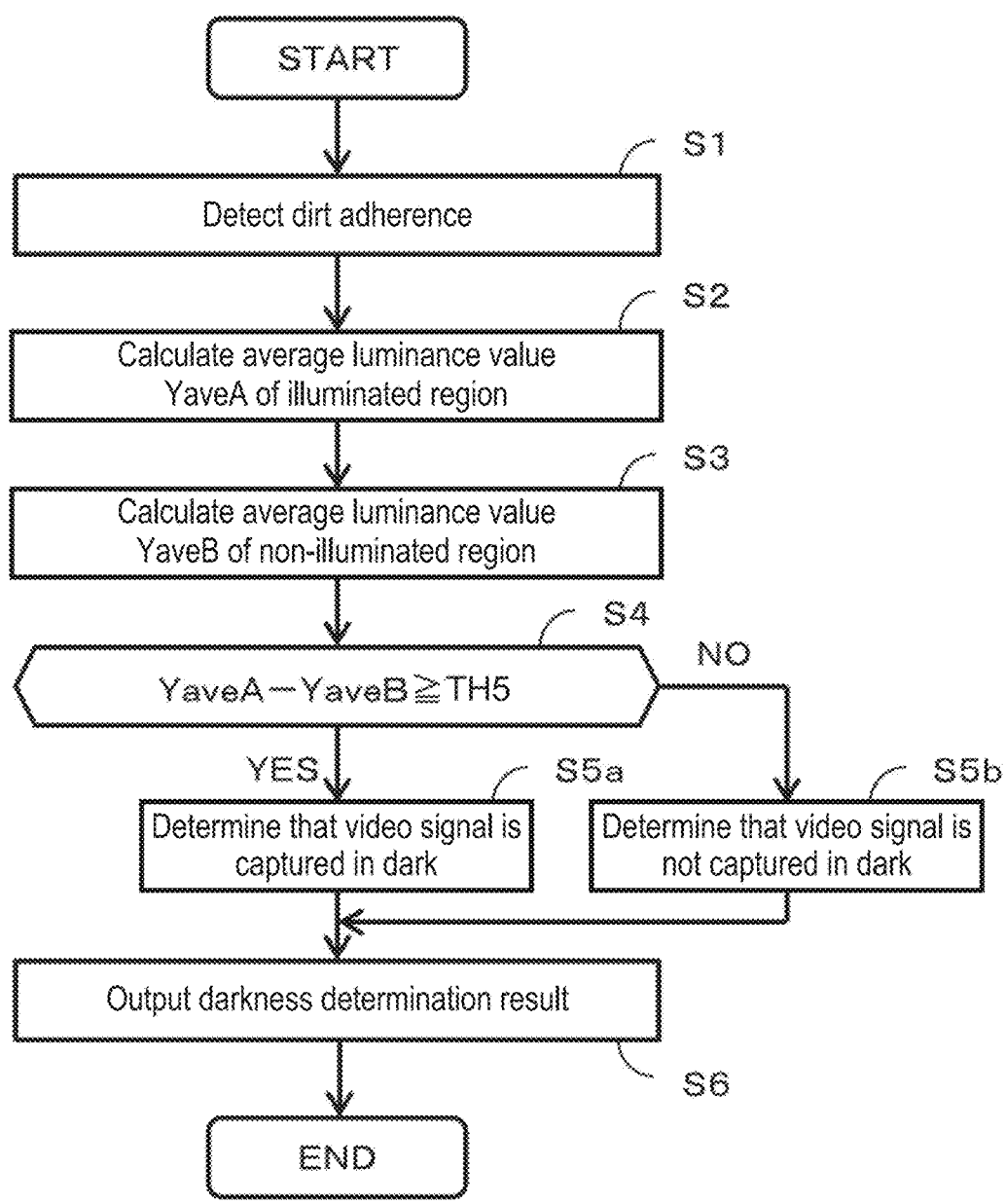

37(31)

IMAGE MONITORING DEVICE, IMAGE MONITORING METHOD, AND RECORDING MEDIUM

CROSS-REFERENCE TO RELATED APPLICATIONS

This application is a continuation of the PCT International Application No. PCT/JP2018/025299 filed on Jul. 4, 2018, which claims the benefit of foreign priority of Japanese patent application No. 2017-149224 filed on Aug. 1, 2017, the contents all of which are incorporated herein by reference.

BACKGROUND

1. Technical Field

The present disclosure relates to an image monitoring device, an image monitoring method, and a recording medium on which an image monitoring program is stored.

2. Description of the Related Art

Monitoring devices have been proposed each which analyzes an image obtained by a camera mounted to a vehicle to detect another vehicle or a person. A method has also been proposed which detects dirt adhered to a camera, because dirt, such as mud, adhered to the camera prevents accurate detection (for example, Japanese Patent No. 4,087,600 (hereinafter, referred to as Patent Literature (PTL) 1), and Japanese Patent No. 3,807,331 (hereinafter, referred to as PTL 2)).

SUMMARY

The present disclosure provides an image monitoring device, an image monitoring method, and an image monitoring program suitable also in cases where dirt adhered to a camera may be incorrectly detected.

An image monitoring device according to one aspect of the present disclosure includes a luminance calculator and a darkness determiner. The luminance calculator calculates a first average luminance value of an illuminated region which is illuminated with a lamp and a second average luminance value of a non-illuminated region which is not illuminated with the lamp. The illuminated region and the non-illuminated region are included in a video signal generated by capturing with a lens. The darkness determiner determines whether or not the video signal is captured in dark by comparing a difference between the first average luminance value and the second average luminance value of the non-illuminated region with a first threshold value.

In an image monitoring method according to one aspect of the present disclosure, a first average luminance value of an illuminated region which is illuminated with a lamp and a second average luminance value of a non-illuminated region which is not illuminated with the lamp are calculated. The illuminated region and the non-illuminated region are included in a video signal generated by capturing with a lens. Then, whether or not the video signal is captured in dark is determined by comparing a difference between the first average luminance value and the second average luminance value with a first threshold value.

An image monitoring program according to one aspect of the present disclosure causes a computer to function as the luminance calculator and the darkness determiner. Moreover, a non-transitory recording medium according to one aspect of the present disclosure stores the image monitoring program that is computer-readable.

The present disclosure provides an image monitoring device, an image monitoring method, an image monitoring program, and a recording medium suitable also in cases where dirt adhered to a camera may be incorrectly detected.

BRIEF DESCRIPTION OF DRAWINGS

FIG. 1 is a block diagram illustrating a schematic configuration of an image monitoring device according to an embodiment of the present disclosure.

FIG. 2 is a flowchart of an example of a processing operation of the image monitoring device illustrated in FIG. 1.

FIG. 4 schematically illustrates video generated by capturing with a rear camera when a vehicle moves forward in a state where the road surface is light and a license lamp is turned on.

DETAILED DESCRIPTION OF PREFERRED EMBODIMENTS

Prior to the description of an embodiment of the present disclosure, origins that led to the idea of the present disclosure will be briefly described.

When the method described in PTL 1 is applied to the detection of dirt adherence, the number M of pixels having a medium or greater amount of edges (equal to or greater than threshold value TH1) and the number N of pixels having a large amount of edges (equal to or greater than threshold value TH2 (>TH1)) in a video signal are determined. Then, when the state in which M is greater than threshold value TH3 and N/M is less than or equal to threshold value TH4 (that is, the state in which there is much contour blurring) continues for predetermined period T, it is determined that dirt is adherent to the lens.

In this method, it is possible to accurately detect the adherence of dirt in the state where the road surface is light. In contrast, in the state where the license lamp is turned on in the dark, even if no dirt is adherent to the lens, it may be incorrectly determined that dirt is adherent to the lens. The case where no dirt is adherent to the lens will be described below. Hereinafter, a region which is illuminated with the license lamp is referred to as illuminated region 31, and a region which is not illuminated with the license lamp is referred to as non-illuminated region 33.

Figure 4:
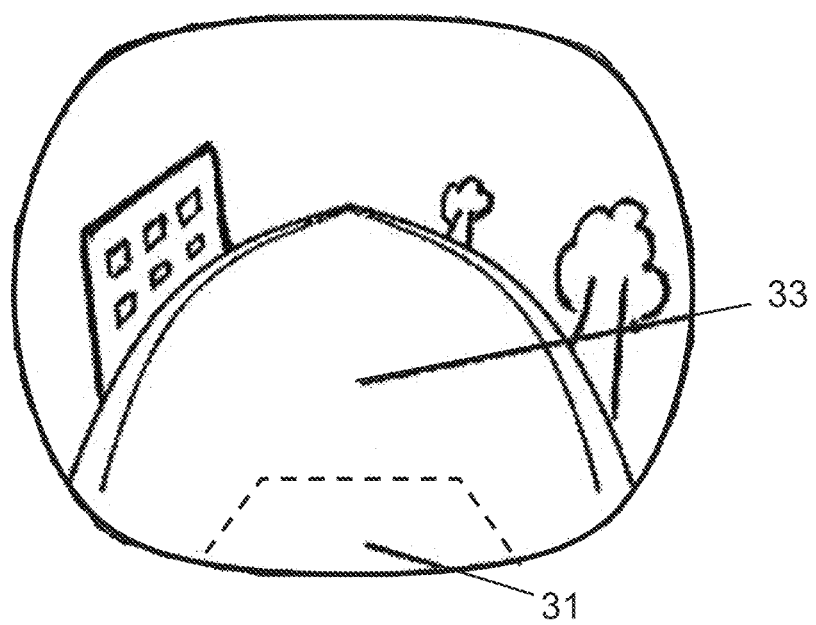

FIG. 4 schematically illustrates video generated by capturing with a rear camera when a vehicle moves forward in the state where the road surface is light and the license lamp is turned on. When the road surface is light, there is no significant difference between the luminance of illuminated region 31 and the luminance of non-illuminated region 33, and there is no state with much contour blurring, or even if there is such a state, it does not continue for a long period of time. The state would be more like a state where illumination of the license lamp is difficult to see. Therefore, blurring of the boundary between illuminated region 31 and non-illuminated region 33 is difficult to recognize. Accordingly, it is correctly determined that no dirt is adherent to the lens.

Figure 5:
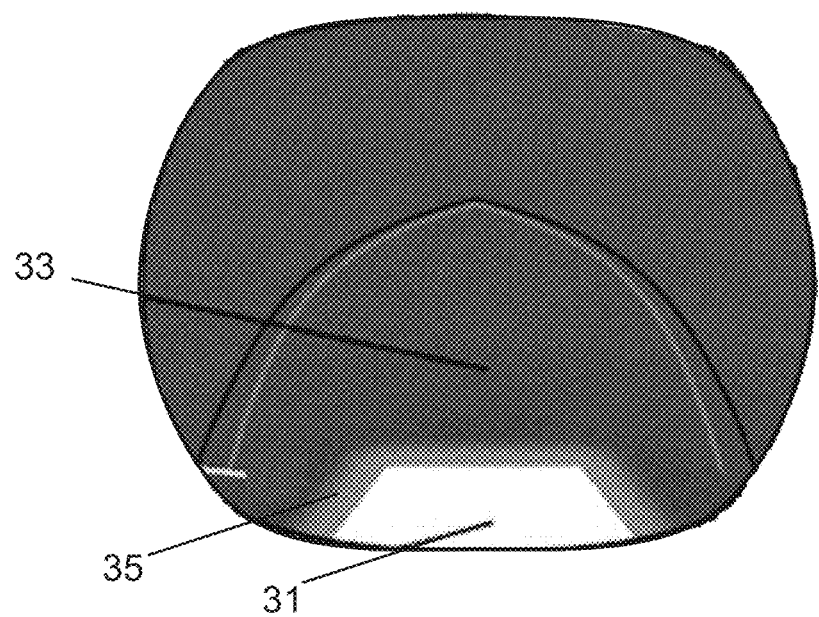
FIG. 5 schematically illustrates video generated by capturing with the rear camera when the vehicle moves forward in a state where the license lamp is turned on in the dark.
Figure 6:
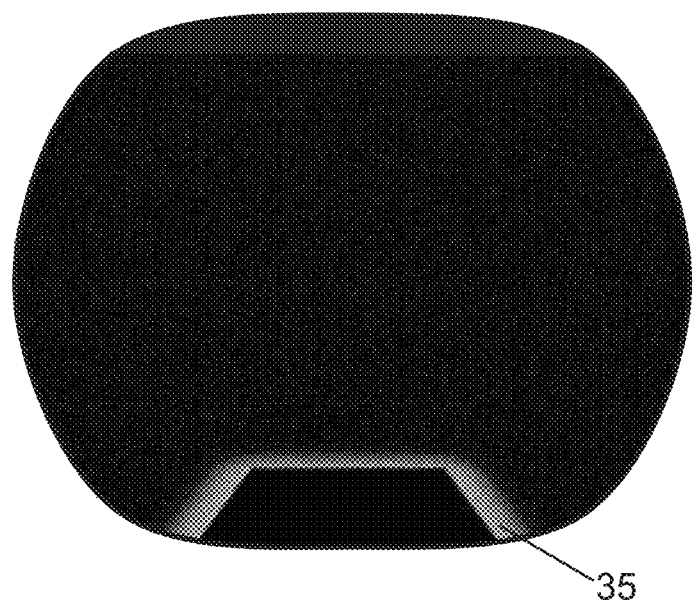
FIG. 6 schematically illustrates a region including much contour blurring in the image illustrated in FIG. 5.

FIG. 5 schematically illustrates video generated by capturing with the rear camera when the vehicle moves forward in the state where the license lamp is turned on in the dark. FIG. 6 schematically illustrates an extracted region (hereinafter, blurred region) 35 including much contour blurring in the image illustrated in FIG. 5. In the dark, illuminated region 31 is light and non-illuminated region 33 is dark. Therefore, blurred region 35 always exists at the boundary between illuminated region 31 and non-illuminated region 33, and the period, during which there are much contour blurring, continues for a long period of time. Therefore, even if no dirt is adherent to the lens, it is incorrectly determined that dirt is adherent to the lens.

When, for example, the method described in PTL 2 is applied as another dirt detection method, inter-frame differences of video signals obtained at different timings are sequentially accumulated, and when a region where the accumulated value is less than or equal to a predetermined value is large, it is determined that dirt is adherent to the lens.

Also in this method, it is possible to accurately detect the adherence of dirt when the road surface is light. In contrast, in the state where the license lamp is turned on in the dark, even if no dirt is adherent to the lens, it may be incorrectly determined that dirt is adherent to the lens. Hereinafter, the case where no dirt is adherent to the lens will be described.

As described with reference to FIG. 4, when the road surface is light, both illuminated region 31 and non-illuminated region 33 are sufficiently light. Hence, video of both regions varies from time to time, making the inter-frame differences large. Accordingly, a region where the accumulated value of the inter-frame differences is equal to or less than the predetermined value is small, leading to an accurate determination that no dirt is adherent to the lens.

Figure 7:
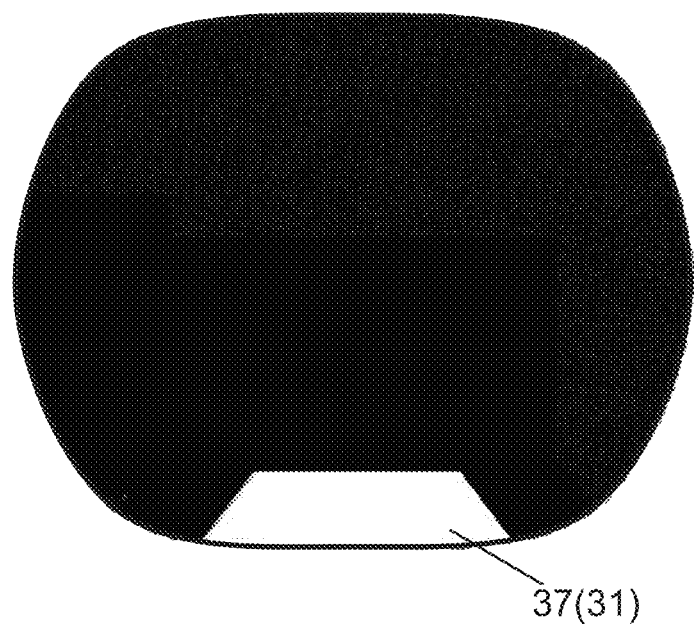
FIG. 7 schematically illustrates a region having a small inter-frame difference in the image illustrated in FIG. 5.

FIG. 7 schematically illustrates region 37 having a small inter-frame difference in the video illustrated in FIG. 5. The video of non-illuminated region 33 varies from time to time, making the inter-frame differences large. In contrast, the video of illuminated region 31 is too bright and hardly varies, making the inter-frame differences small. Hence, in large region 37 which is entire illuminated region 31, the accumulated value of the inter-frame differences is equal to or less than the predetermined value. Therefore, even if no dirt is adherent to the lens, it is incorrectly determined that dirt is adherent to the lens.

In any of these cases, even though no dirt is adherent to the camera, it may be incorrectly determined in the dark that dirt is adherent to the camera. As described, in the conventional techniques, dirt cannot always be detected accurately.

Hereinafter, an embodiment of the present disclosure will be specifically described with reference to the drawings.

The present embodiment focuses on monitoring whether or not dirt is adherent to a lens of a rear camera, based on the video signal obtained by capturing with the rear camera, and in particular, performing monitoring in the state where a license lamp provided near the rear camera is turned on.

Figure 3:
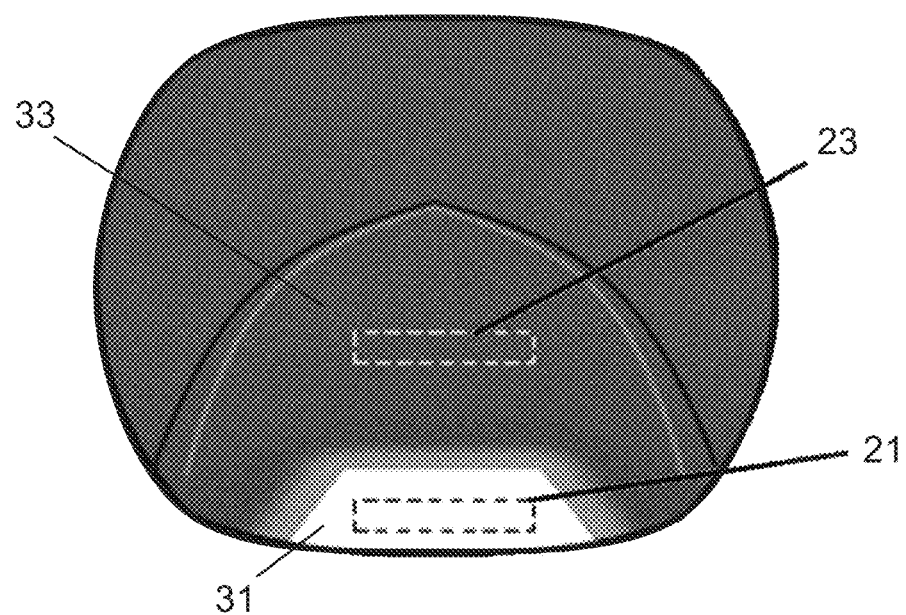
FIG. 3 schematically illustrates an illuminated region and a non-illuminated region for which average luminance values are calculated.

FIG. 1 is a block diagram illustrating a schematic configuration of an image monitoring device according to the embodiment. FIG. 2 is a flowchart of an example of a processing operation of the image monitoring device illustrated in FIG. 1. FIG. 3 schematically illustrates illuminated region 31 and non-illuminated region 33 for which average luminance values are calculated.

The image monitoring device includes dirt adherence detector 1, luminance calculator 2, and darkness determiner 3. Part or all of these functional units may be implemented by hardware or software. In the latter case, each functional unit can be realized by the processor executing a predetermined image monitoring program. The image monitoring program may be stored on a non-transitory computer-readable recording medium such as a disk memory.

The image monitoring device receives a video signal generated by capturing with a lens of a rear camera (not illustrated, for example, a fisheye lens). The video signal is input to dirt adherence detector 1 and luminance calculator 2.

Dirt adherence detector 1 detects whether or not dirt is adherent to the lens of the rear camera, based on the input video signal, and outputs the detection result. As a specific dirt detection method of dirt adherence detector 1, the method described in PTL 1 or PTL 2 described above can be applied.

Luminance calculator 2 calculates average luminance value YaveA of illuminated region 31 and average luminance value YaveB of non-illuminated region 33 in the video signal. Darkness determiner 3 determines whether or not the vehicle is traveling in the dark, based on average luminance value YaveA of illuminated region 31 and average luminance value YaveB of non-illuminated region 33.

Next, an example of the processing operation of the image monitoring device illustrated in FIG. 1 will be described with reference to FIG. 2. Dirt adherence detector 1 analyzes the video signal to detect dirt adhered to the lens (Step S1). Darkness determination is performed concurrently with the dirt adherence detection.

Specifically, luminance calculator 2 calculates average luminance value YaveA of illuminated region 31 and average luminance value YaveB of non-illuminated region 33 in the video signal (Steps S2 and S3). Average luminance value YaveA of illuminated region 31 may be the average luminance value of entire illuminated region 31, or may be the average luminance value of part 21 of illuminated region 31. Similarly, average luminance value YaveB of non-illuminated region 33 may be the average luminance value of entire non-illuminated region 33, or may be the average luminance value of part 23 of non-illuminated region 33. In any of these cases, it is set in advance for which part (region) in the video signal the average luminance value is to be calculated.

Subsequently, darkness determiner 3 determines whether the video signal is captured in the dark or not, based on average luminance values YaveA and YaveB, specifically, by comparing the difference between average luminance values YaveA and YaveB with predetermined threshold value TH5. More specifically, when the following formula (1) is satisfied (YES in Step S4), darkness determiner 3 determines that the video signal is captured in the dark (Step S5a), and when the following formula (1) is not satisfied (NO in Step S4), darkness determiner 3 determines that the video signal is not captured in the dark (Step S5b).

$$YaveA - YaveB \geq TH5 \qquad (1)$$

In other words, when the vehicle is not in the dark (for example, when traveling the city area at night), non-illuminated region 33 is also light. Therefore, the difference between average luminance value YaveA of illuminated region 31 and average luminance value YaveB of non-illuminated region 33 is small. Accordingly, the above formula (1) is not satisfied. Hence, when the above formula (1) is not satisfied, darkness determiner 3 determines that the video signal is not captured in the dark.

In contrast, when the vehicle is in the dark, non-illuminated region 33 is dark, and illuminated region 31 is light because it is illuminated with the license lamp. Therefore, the difference between average luminance value YaveA of illuminated region 31 and average luminance value YaveB of non-illuminated region 33 is large. Accordingly, the above formula (1) is satisfied. Hence, when the above formula (1) is satisfied, darkness determiner 3 determines that the video signal is captured in the dark. Darkness determiner 3 then outputs the determination result (Step S6).

By the above processing, the image monitoring device outputs not only the result of the dirt adherence detection, but also the result of the darkness determination. As a result, when the vehicle is in the dark, it is recognized that the result of the dirt adherence detection is possibly incorrect. In other words, the image monitoring device determines that the accuracy of the dirt adherence detection by dirt adherence detector 1 is lower when darkness determiner 3 determines the video signal is captured in the dark than when darkness determiner 3 determines the video signal is not captured in the dark.

In Step S4, darkness determiner 3 may perform the darkness determination in consideration of the comparison between average luminance value YaveA of illuminated region 31 and predetermined threshold value TH6 as well. Specifically, when the above formula (1) is satisfied and the following formula (2) is satisfied, darkness determiner 3 may determine that the video signal is captured in the dark.

$$YaveA \geq TH6 \quad (2)$$

This is because when illuminated region 31 is not so light (for example, when the license lamp is not on), dirt adherence detector 1 is less likely to perform incorrect detection.

As described above, in the present embodiment, whether the video signal is captured in the dark or not is also determined based on the average luminance values of illuminated region 31 and non-illuminated region 33. Therefore, it is possible to determine the validity of the result of the dirt adherence detection.

The above embodiment is for providing an example of the technique of the present disclosure, and thus various modifications, interchanges or replacement, additions, omissions, and the like are possible in the scope of the claims and equivalent scope thereof.

For example, in the configuration illustrated in FIG. 1, the result of the dirt adherence detection and the result of the darkness determination are separately output. However, dirt adherence detector 1 may receive the determination result of darkness determiner 3 and reflect the result on the dirt adherence detection.

The present disclosure is useful, for example, as an image monitoring device which analyzes an image obtained by a camera mounted to a vehicle to detect another vehicle or a person.

What is claimed is:

1. An image monitoring device comprising:
   a luminance calculator configured to calculate a first average luminance value of an illuminated region which is illuminated with a lamp and a second average luminance value of a non-illuminated region which is not illuminated with the lamp, the illuminated region and the non-illuminated region being included in a video signal generated by capturing with a lens;
   a darkness determiner configured to determine whether or not the video signal is captured in dark by comparing a difference between the first average luminance value and the second average luminance value with a first threshold value; and
   a dirt adherence detector configured to detect whether or not dirt is adherent to the lens, based on the video signal,
   wherein when the darkness determiner determines the video signal is captured in dark, the image monitoring device determines that an accuracy of detection of dirt adherence of the dirt adherence detector is lower than an accuracy of detection of dirt adherence of the dirt adherence detector when the darkness determiner determines the video signal is not captured in the dark.

2. The image monitoring device according to claim 1, wherein a detection result detected by the dirt adherence detector and a determination result determined by the darkness determiner are separately output.

3. The image monitoring device according to claim 1, wherein the dirt adherence detector reflects a determination result determined by the darkness determiner on detection of dirt adherence.

4. An image monitoring device comprising:
   a luminance calculator configured to calculate a first average luminance value of an illuminated region which is illuminated with a lamp and a second average luminance value of a non-illuminated region which is not illuminated with the lamp, the illuminated region and the non-illuminated region being included in a video signal generated by capturing with a lens; and
   a darkness determiner configured to determine whether or not the video signal is captured in dark by comparing a difference between the first average luminance value and the second average luminance value with a first threshold value,
   wherein the darkness determiner determines whether or not the video signal is captured in dark by comparing the difference between the first average luminance value and the second average luminance value with the first threshold value, and by comparing the first average luminance value with a second threshold value.

5. An image monitoring method comprising:
   calculating a first average luminance value of an illuminated region which is illuminated with a lamp and a second average luminance value of a non-illuminated region which is not illuminated with the lamp, the illuminated region and the non-illuminated region being included in a video signal generated by capturing with a lens;
   determining whether or not the video signal is captured in dark by comparing a difference between the first average luminance value and the second average luminance value with a first threshold value; and
   detecting whether or not dirt is adherent to the lens, based on the video signal,
   wherein an accuracy of detection of dirt adherence when it is determined that the video signal is captured in dark is determined to be lower than an accuracy of detection of dirt adherence when it is determined that the video signal is not captured in the dark.

6. The image monitoring method according to claim 5, wherein a detection result of whether or not dirt is adherent to the lens and a determination result of whether or not the video signal is captured in the dark are separately output.

7. The image monitoring method according to claim 5, wherein a determination result of whether or not the video signal is captured in the dark is reflected on the detecting of whether or not dirt is adherent to the lens.

\* \* \* \* \*